Sept. 20, 1966 W. A. STEWART 3,273,591
COMPRESSOR VALVE WITH REMOVABLE GUIDE MEANS
Filed Jan. 21, 1964

INVENTOR
WARREN A. STEWART
By Joseph K. Schofield
ATTORNEY

United States Patent Office 3,273,591
Patented Sept. 20, 1966

3,273,591
COMPRESSOR VALVE WITH REMOVABLE
GUIDE MEANS
Warren A. Stewart, Easton, Pa., assignor, by mesne assignments, to Cooper Industries, Inc., a corporation of Ohio
Filed Jan. 21, 1964, Ser. No. 339,152
3 Claims. (Cl. 137—512.1)

This invention relates to valves for compressors and more particularly to means to guide the valve discs during their movement toward and from their seated positions.

A primary object of the invention is to provide a removable guiding member adapted for placement within the seat member of the valve assembly and maintain in position two discs of annular form by engagement of their intermediate edges.

Another object of importance is that the guide member is retained within an annular groove formed in the surface of the seat member having spaced bearing surfaces for the valve discs at its inner and outer peripheries, the space between the spaced bearing surfaces being cut away to increase the space within the valve for the flow of the air or gas being compressed.

With the above and other objects in view the invention may include the features of construction and operation set forth in the following specification and illustrated in the accompanying drawing.

In the drawing annexed hereto and forming a part of this specification, I have shown the invention embodied in a valve assembly for air or gas compressors of the reciprocating piston type having valves of flat annular form operating in the same plane and with one valve disc surrounding the other, but it will be understood that the invention can be otherwise embodied and that the drawing is not to be construed as defining or limiting the scope of the invention, the claims appended to this specification being relied upon for that purpose.

In the above referred to drawing, there has been shown but one embodiment of the invention which is now deemed preferable, but it is to be understood that changes and modifications may be made within the scope of the appended claims without departing from the spirit of the invention.

Figure 1:
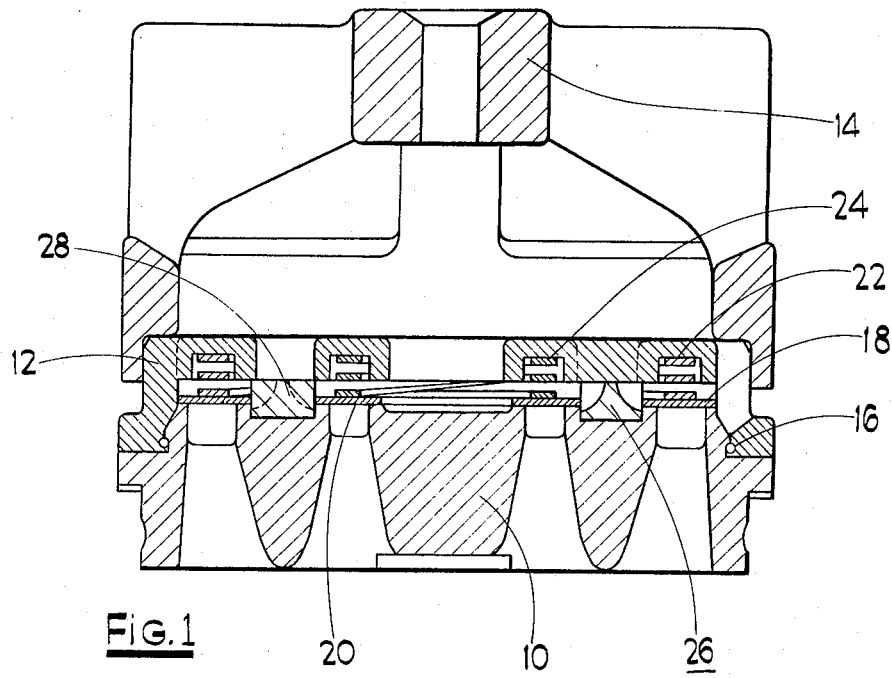
FIG. 1 is a central vertical sectional view showing a complete valve assembly incorporating the present invention.

Referring more in detail to the figures of the drawing and first to FIG. 1, it will be seen that the valve assembly comprises a seat member 10, a guard member 12 and a yoke member 14. Means in the form of a snap ring 16 may be used to retain the seat and guard members together. Associated with these valve assembly members but not secured thereto is the yoke member 14 for retaining the valve assembly in position in the wall of a compressor chamber.

As the above described members are or may be similar to their corresponding parts shown in the patent to Nathan 1,586,832, granted June 1, 1926, further description is not thought to be necessary.

Within spaces between the seat member 10 and guard 12 are valves in the form of annular flat rings or discs 18 and 20. These discs 18 and 20 are normally forced toward their seats by individual springs 22 and 24. As shown, the valve seats are annular flat surfaces formed in the same plane at the upper surface of the seat member 10.

Figure 2:
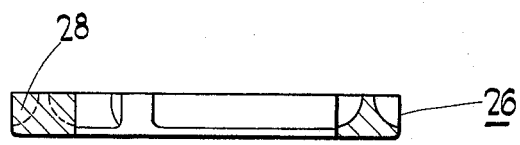
FIG. 2 is a central sectional view taken on the planes of line 2—2 in FIG. 3 showing the valve guide.
Figure 3:
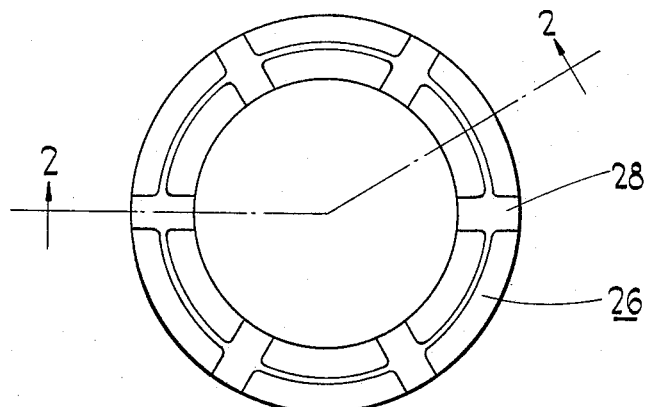
FIG. 3 is a plan view of the guide member shown in FIGS. 1 and 2.

Within the space between the two concentrically disposed valve discs 18 and 20 is placed the guide 26 of annular form fitting within an annular groove formed in the upper surface of the seat member 10. As shown most clearly in FIGS. 2 and 3 the guide 26 has six spaced portions 28 having vertical inner and outer walls adapted to slidably contact the inner periphery of the outer valve disc 18 and the outer periphery of the inner disc 20. Between these guiding surfaces 28 the inner and outer walls of the guide 26 are cut away to increase the areas of the air or gas spaces through the valve. The guide 26 initially is an annulus having cylindrical walls and the guiding surfaces of the guide are spaced portions of these cylindrical walls.

The guide 26 made as above described may be machined to its final shape before assembly. When the guiding surfaces become worn the guide may be removed and another substituted without requiring substitution of a new guard as in the form of valve assembly shown in the above referred to patent. The guard also may be formed of any appropriate metal, plastic, or other material.

I claim:

1. A valve for compressors comprising a seat member, a guard member secured thereto, flat annular valve discs disposed between said seat member and guard member, and a separate guide member between said valve discs, said guide member being removably mounted partially within the seat member and having spaced portions respectively slidably engaging a periphery of said valve discs.

2. A valve for compressors comprising a seat member, a guard member secured thereto, flat annular valve discs disposed one within the other between said seat member and guard member, and a separate guide member for said valve discs, said guide member being removably mounted within an annular groove in said seat member and having spaced portions contacting peripheries of said valve discs.

3. A valve for compressors comprising a seat member, a guard member secured thereto, flat annular valve discs disposed one within the other, and a separate guide member for said valve discs, said guide member being partially housed within said seat member concentrically between said valve discs and having spaced portions on its inner and outer periphery slidably engaging said valve discs.

References Cited by the Examiner
UNITED STATES PATENTS

| | | | |
|---|---|---|---|
| 556,024 | 3/1896 | Pew | 137—543.19 X |
| 1,287,751 | 12/1918 | Richards | 137—512.1 |
| 1,586,832 | 6/1926 | Nathan | 37—525 X |

WILLIAM F. O'DEA, Primary Examiner.

ISADOR WEIL, Examiner.

D. ZOBKIW, Assistant Examiner.